United States Patent [19]

Lilly

[11] 3,838,879
[45] Oct. 1, 1974

[54] MOBILE AIRCRAFT HANGAR AND UTILITY BUILDING

[76] Inventor: Byron K. Lilly, 136 Hilltop Dr., Paso Robles, Calif. 93446

[22] Filed: July 3, 1972

[21] Appl. No.: 268,539

Related U.S. Application Data

[63] Continuation-in-part of Ser. No. 55,354, July 16, 1970.

[52] U.S. Cl. .................... 296/1 R, 52/70, 52/143, 244/114 R
[51] Int. Cl. ............................................ B62d 39/00
[58] Field of Search ............. 344/114 R; 296/26, 27, 296/23, 1 R; 52/143, 237, 79, 73, 86, 64, 68, 69, 70, 71, 65; 49/200, 197, 198, 199

[56] References Cited
UNITED STATES PATENTS

| 2,701,038 | 2/1955 | Mooney | 52/143 X |
| 2,985,446 | 5/1961 | Marmont et al. | 49/200 |
| 3,074,518 | 1/1963 | Conrad et al. | 52/71 X |
| 3,348,344 | 10/1967 | Tatevossian | 52/79 X |
| 3,353,862 | 11/1967 | Tormolen | 52/69 X |
| 3,356,381 | 12/1967 | Rich | 52/143 X |
| 3,600,866 | 8/1971 | Griffith | 52/143 X |
| 3,708,200 | 1/1973 | Richards | 52/71 X |

FOREIGN PATENTS OR APPLICATIONS

| 25,017 | 8/1910 | Great Britain | 52/64 |

*Primary Examiner*—Trygve M. Blix
*Assistant Examiner*—Paul E. Sauberer

[57] ABSTRACT

This invention is an aircraft hangar for private aircraft which can be towed from one location to another. In a first form, the hangar has a body compartment which is mounted on a vehicle frame with a towing tongue and retractible wheels, and wing compartments which extend laterally from each side of the main body compartment. The body compartment encloses the aircraft body and the wing compartments enclose the wings to provide full protection from the environmnet and unauthorized access. The wing compartments fold into the body compartment when the hangar is moved. In its second form, the wing compartments are eliminated and the hangar adapted to serve as a mobile utility building.

15 Claims, 19 Drawing Figures

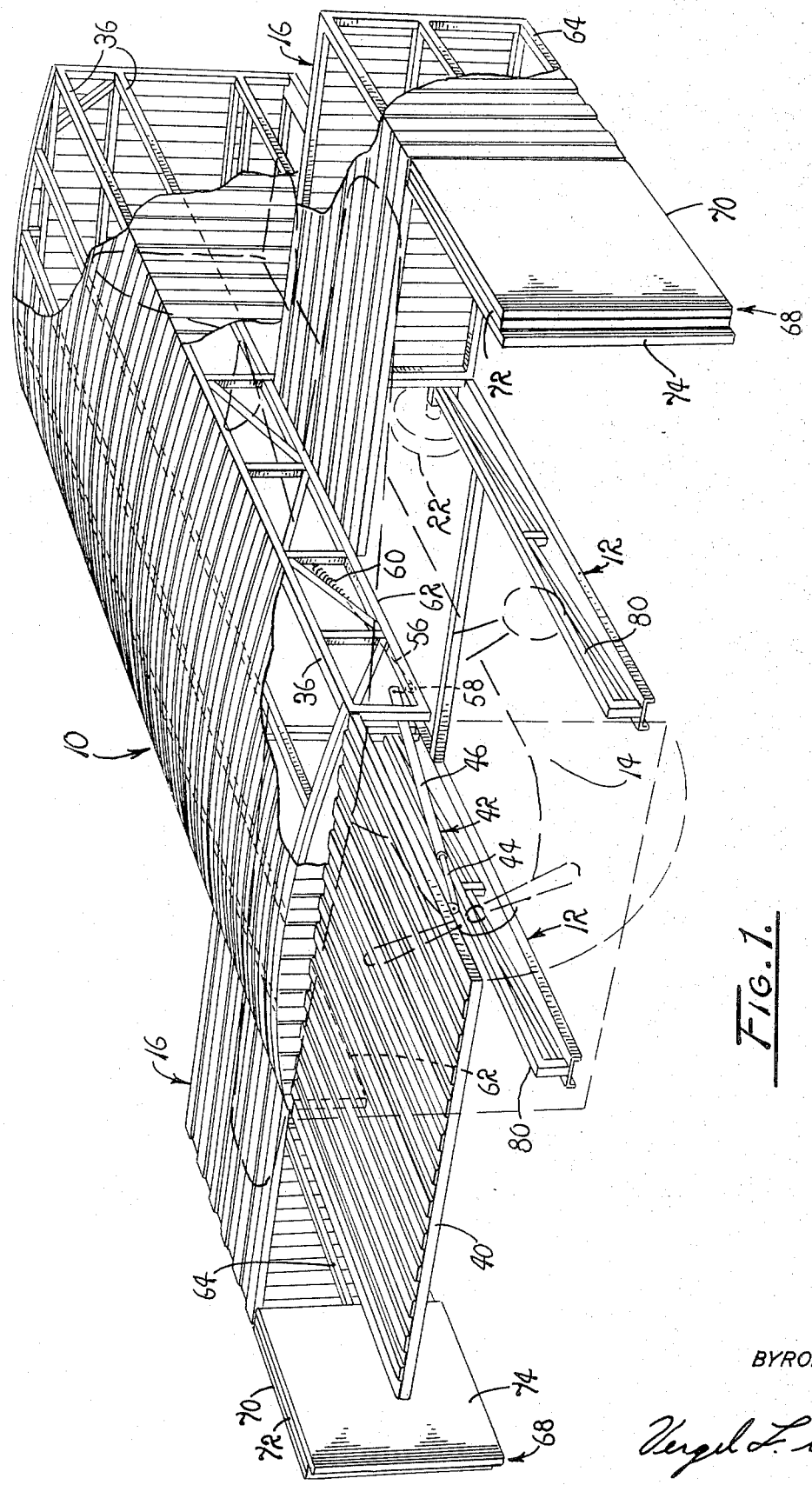

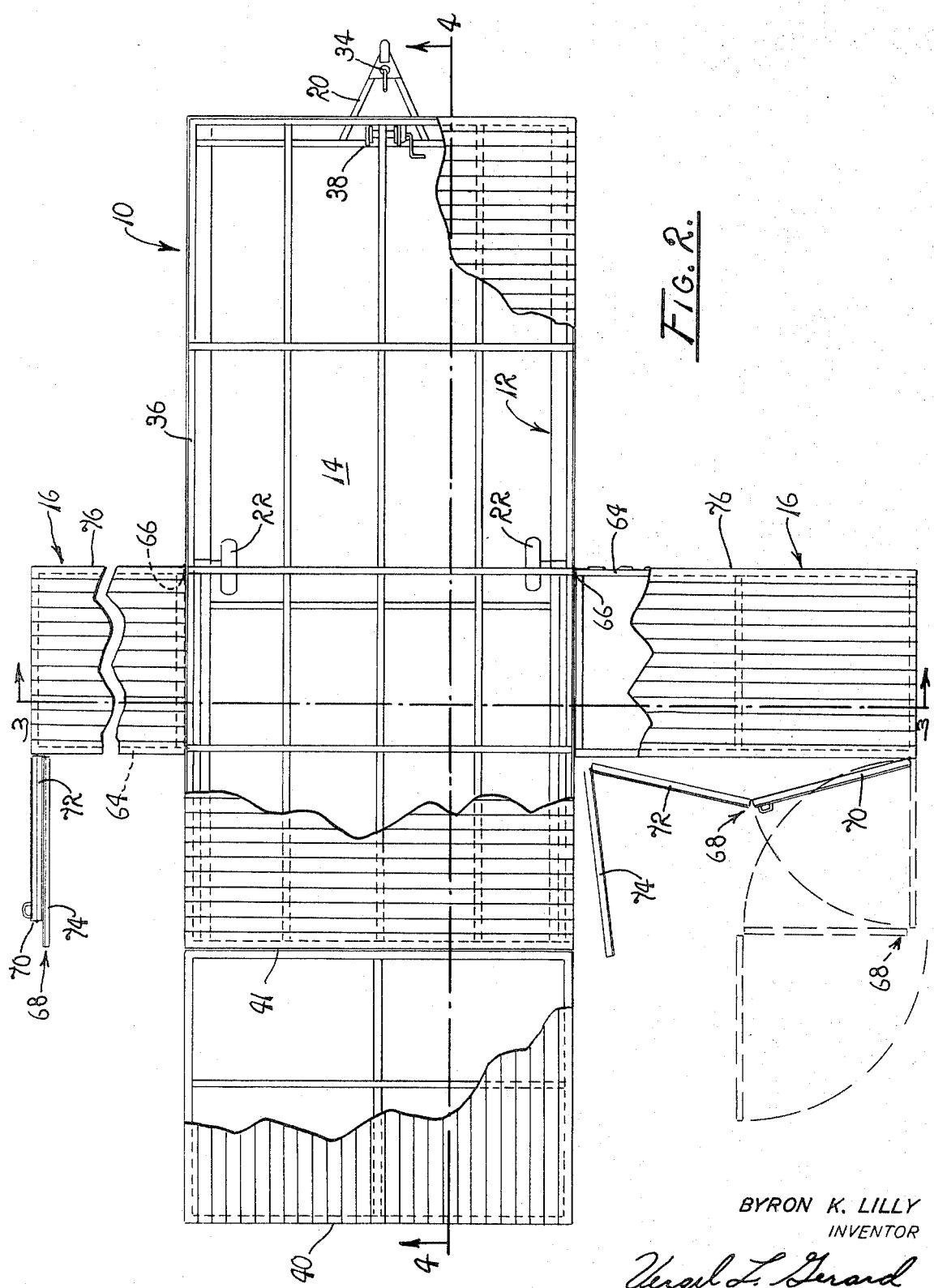

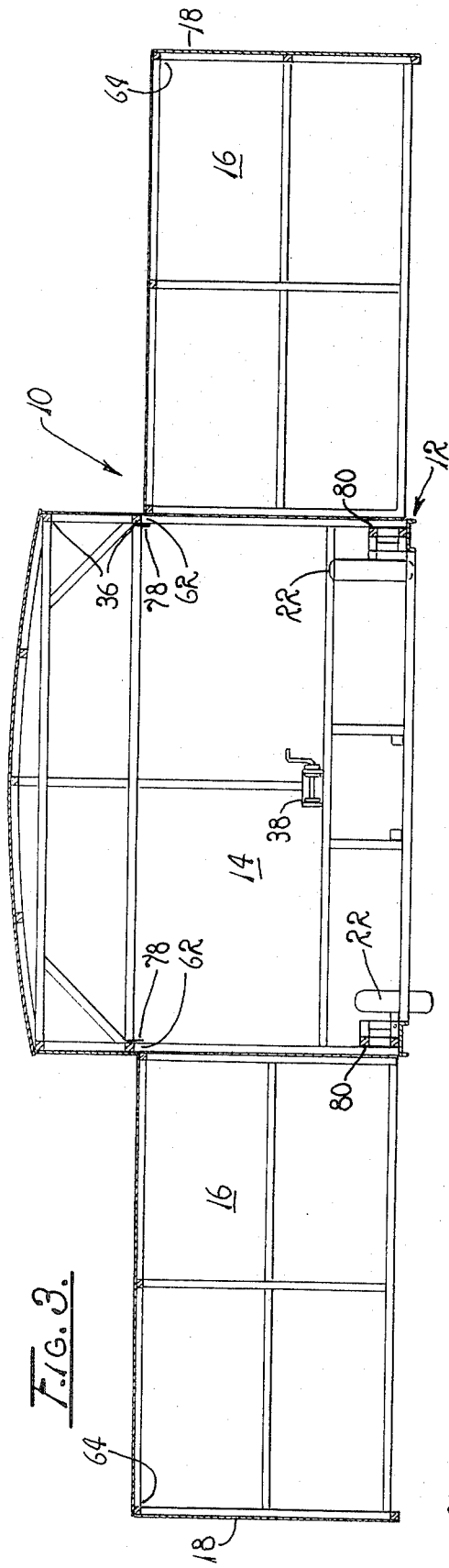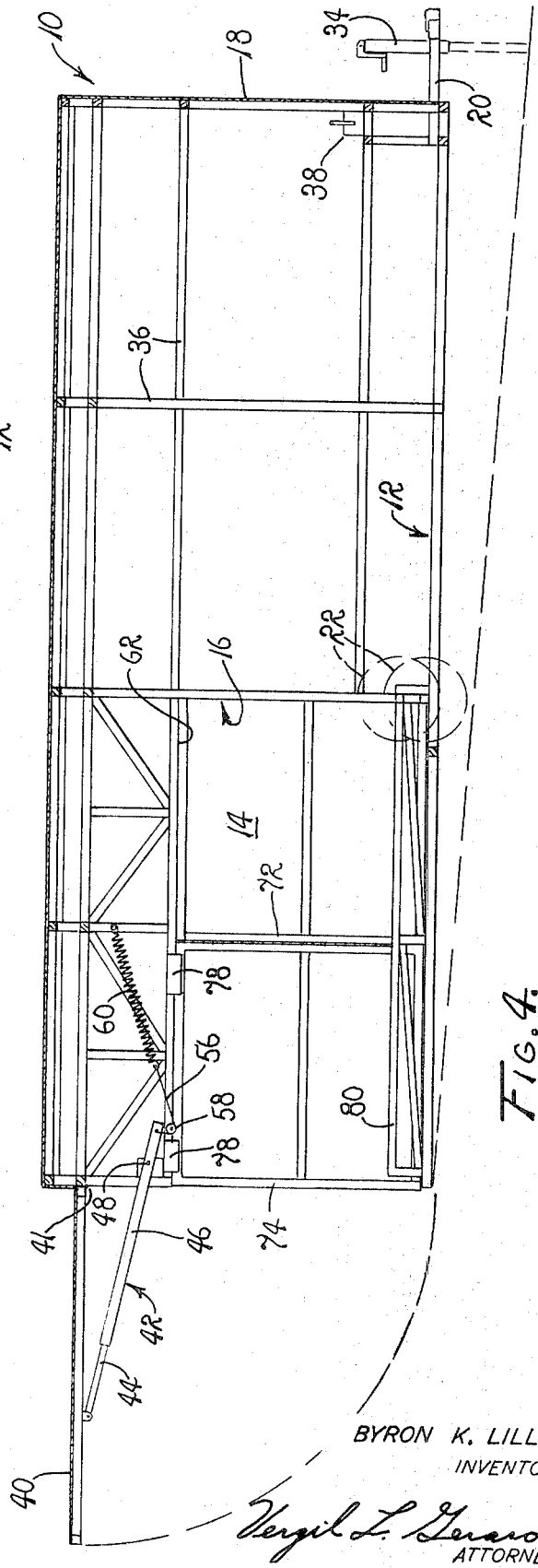

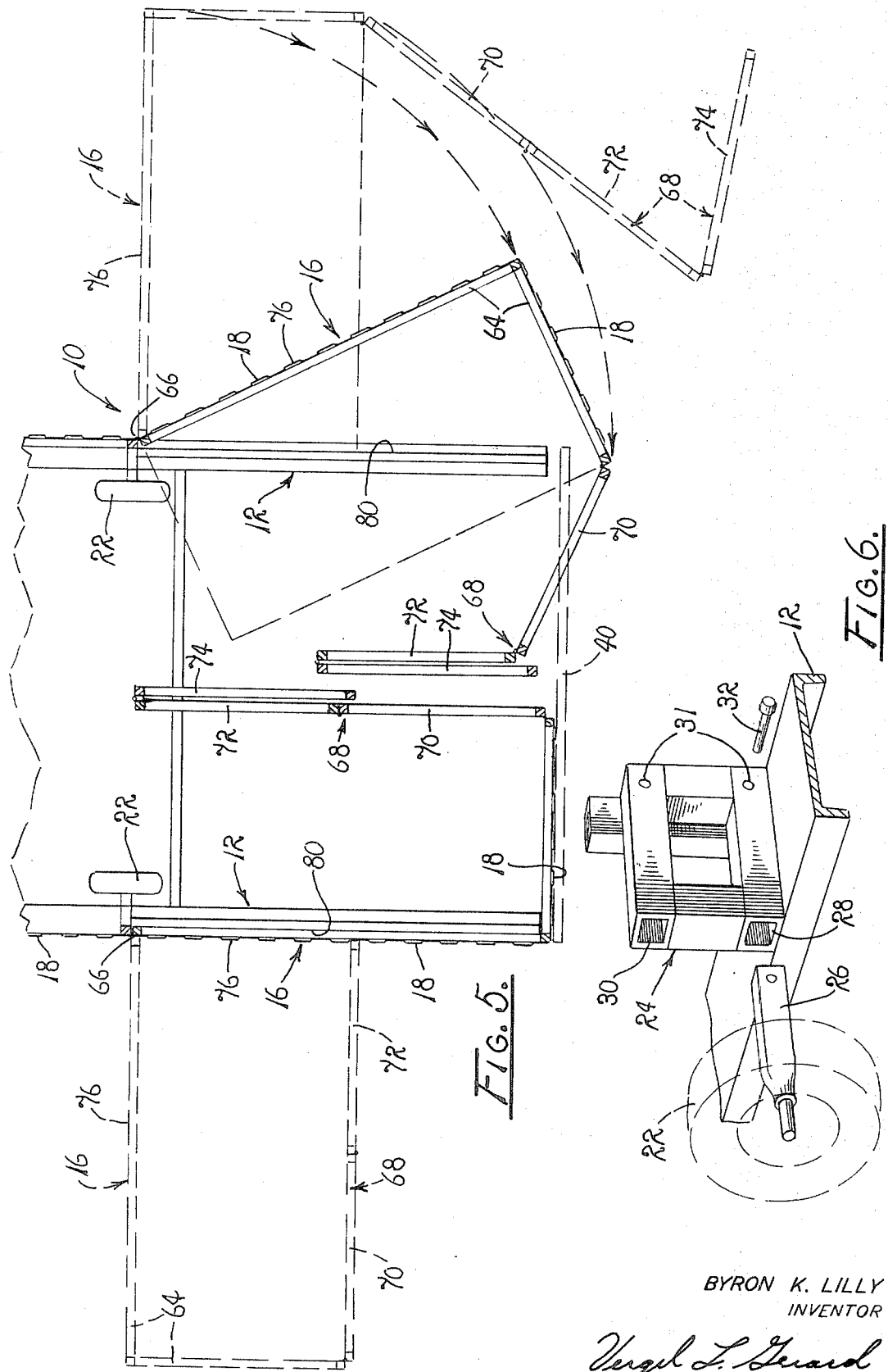

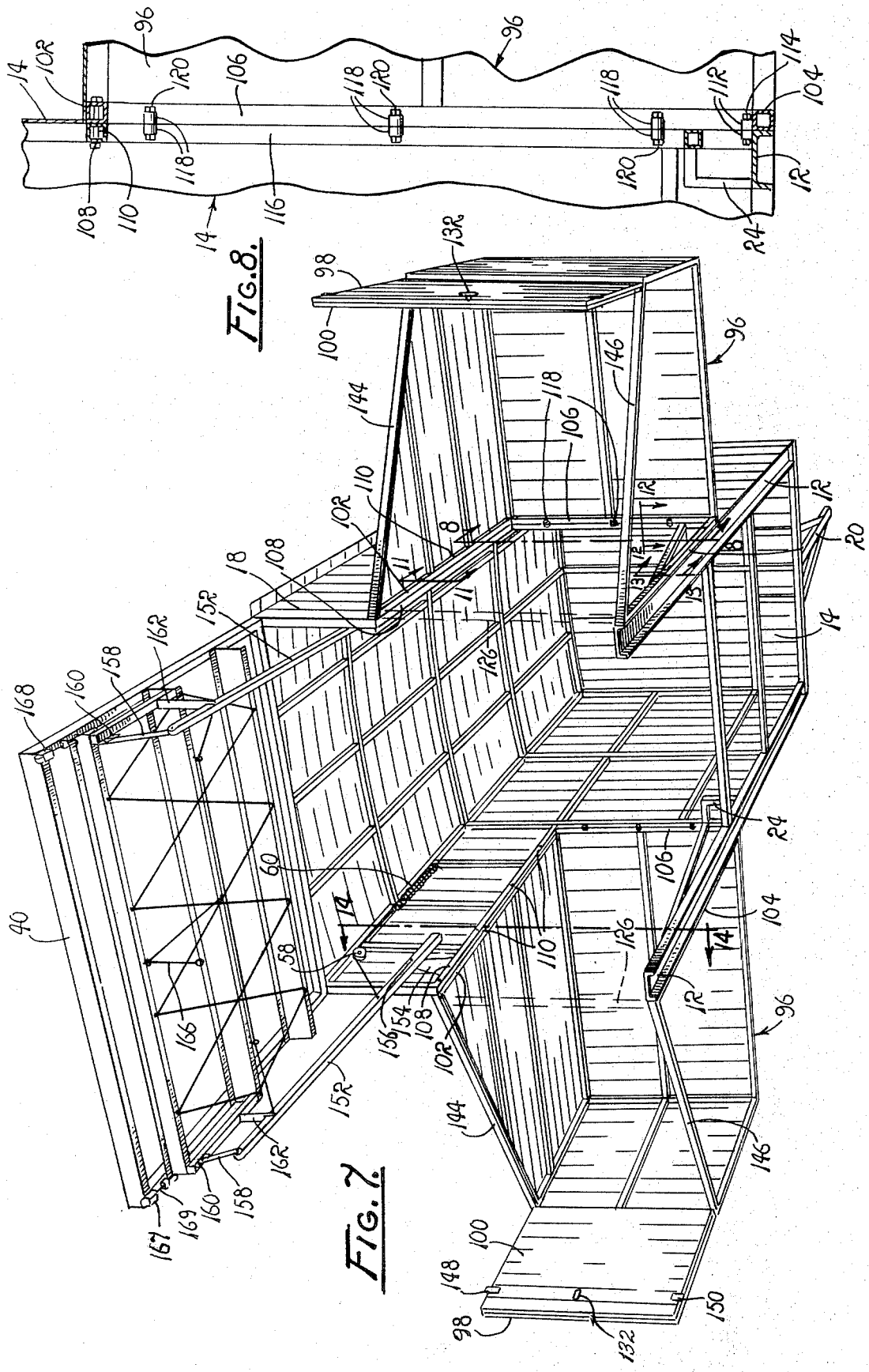

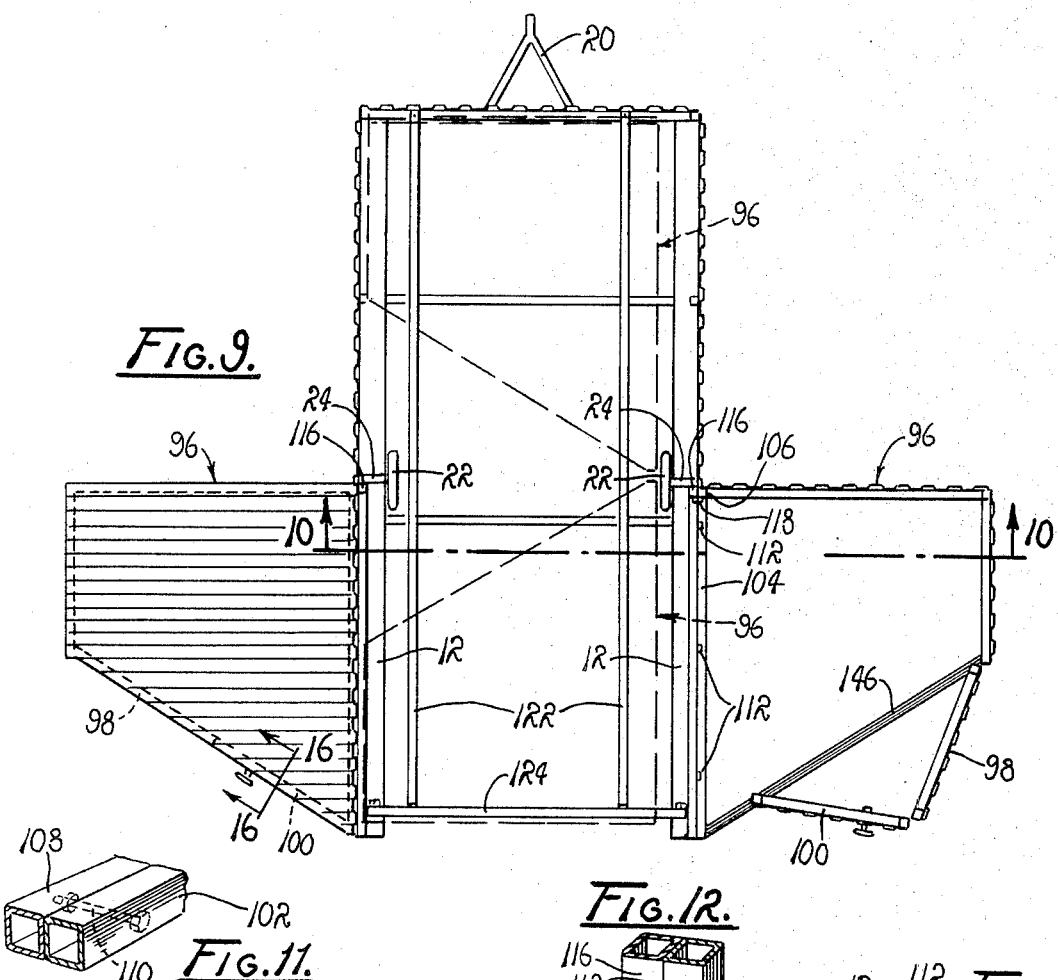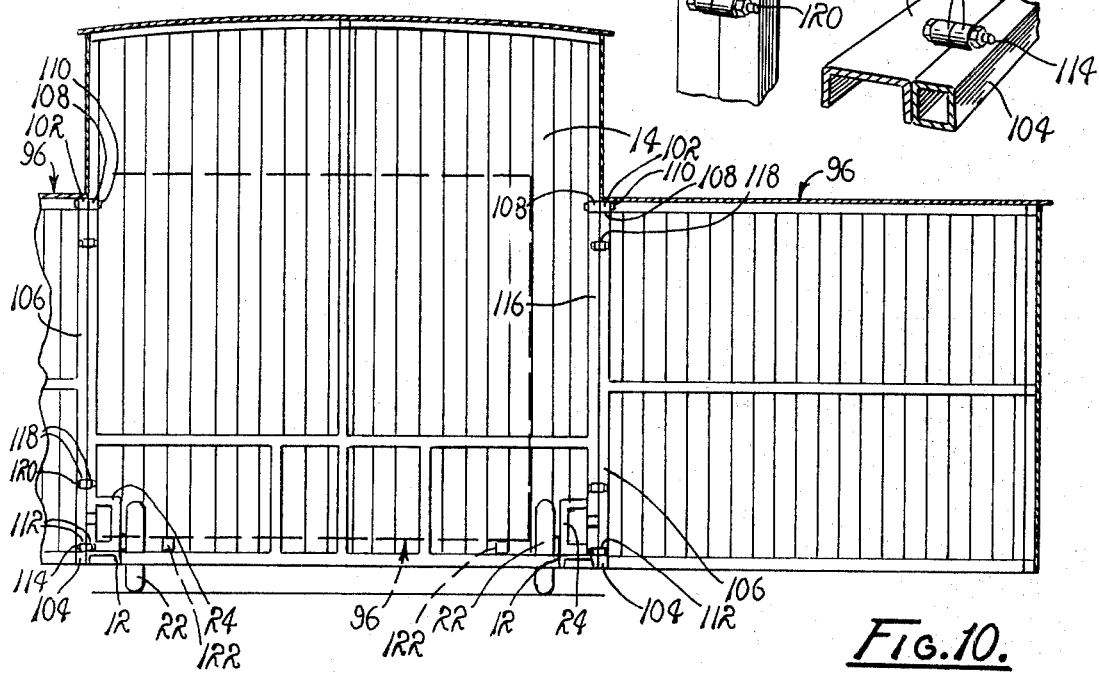

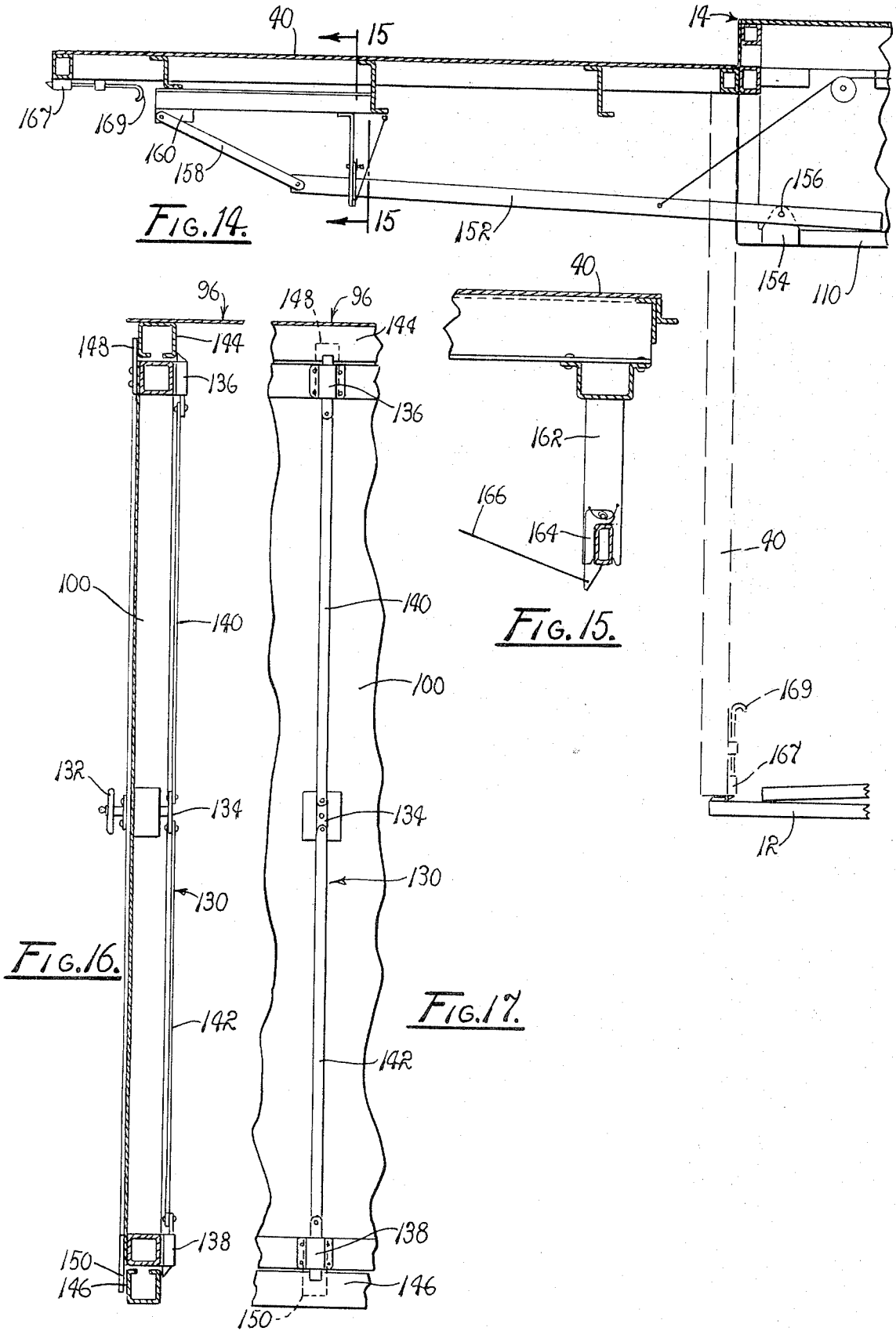

MOBILE AIRCRAFT HANGAR AND UTILITY BUILDING

This application is a continuation-in-part of Application Ser. No. 55,354 filed by applicant on July 16, 1970 and entitled MOBILE AIRCRAFT HANGAR.

BACKGROUND OF THE INVENTION

This invention relates generally to hangar facilities for small aircraft and more particularly to hangars which are mobile and accommodate a single aircraft.

The increased popularity of small aircraft for both business and recreational use has greatly expanded the number of such aircraft. As a result, placement and protection of such aircraft when they are not in use has become a matter of increased concern to their owners.

Large hangar facilities designed to accommodate a number of aircraft are both expensive to rent space in and in most airports are insufficient to meet the demand. As a result, many small aircraft are now merely tied down in open parking areas and are, therefore, exposed to damage by the elements and tampering by unauthorized persons. Certain devices have been conceived which attempt to overcome this problem by providing some protection for such aircraft when parked outside a permanent hangar facility. The devices heretofore conceived have not satisfactorily resolved the problem, however, since they have been either too expensive and permanent in nature, or too temporary and incomplete to give the needed protection for the aircraft.

A need, therefore, exists for a hangar for a single small aircraft which can accommodate the aircraft on an airport parking apron, will give full protection from the elements and unauthorized access, and yet can be readily moved either within an airport or along the highways to another airport.

There is also an increasing need for mobile utility buildings for storage of supplies and tools on construction jobs, for storage of trailerable boats, and similar purposes, by reason of the increased mobility of our society.

OBJECTS OF THE INVENTION

It is, therefore, a major object of my invention to provide an aircraft hangar for small aircraft which totally encloses a single aircraft for complete protection against tampering and the elements.

It is also an important object of my invention to provide an aircraft hangar of the type described which is readily movable both within the confines of an airport and via highways to another airport.

It is another object of my invention to provide an aircraft hangar of the type described which is formed of rigid high strength material to assure durability and break-in resistance, and is yet relatively light in weight and inexpensive to produce.

It is a further object of my invention to provide an aircraft hangar of the type described with doors which open to receive the aircraft and close to contain and protect it.

It is yet another object of my invention to provide an aircraft hangar of the type described which can be adapted to serve as a mobile utility building by exclusion of the wing compartment and other minimal structural changes.

These and other objects and advantages of my invention will be readily apparent from the following detailed description of a preferred embodiment and the accompanying drawings in which:

BRIEF DESCRIPTION OF THE DRAWINGS

FIG. 1 is a perspective view of a preferred embodiment of my invention, showing an aircraft housed therein;

FIG. 2 is a sectional plan view of the preferred embodiment of FIG. 1;

FIG. 3 is a sectional end elevational view of the embodiment of FIG. 1 taken on 3—3 in FIG. 2;

FIG. 4 is a sectional side elevational view of the embodiment of FIG. 1 taken on 4—4 in FIG. 2;

FIG. 5 is a partial plan view showing the stowing of the wing compartments in the body compartment;

FIG. 6 is parallel legs perspective view of the wheel mounting structure in the embodiment of FIG. 1;

FIG. 7 is a bottom perspective view of a modified form of the first embodiment of my invention;

FIG. 8 is an enlarged sectional view taken on 8—8 in FIG. 7;

FIG. 9 is a plan view partially in section of the modified form of my first embodiment;

FIG. 10 is a sectional view taken on 10—10 in FIG. 9;

FIG. 11 is a sectional perspective view taken at 11—11 in FIG. 7;

FIG. 12 is a sectional perspective view taken at 12—12 in FIG. 7;

FIG. 13 is a sectional perspective view taken at 13—13 in FIG. 7;

FIG. 14 is an enlarged sectional view taken on 14—14 in FIG. 7 showing the body portion door in my modified form;

FIG. 15 is an enlarged partial sectional view taken at 15—15 in FIG. 14;

FIG. 16 is an enlarged sectional view taken at 16—16 in FIG. 9;

FIG. 17 is an enlarged partial elevational view of the portion shown in FIG. 16;

DETAILED DESCRIPTION OF A PREFERRED EMBODIMENT

Figure 18:
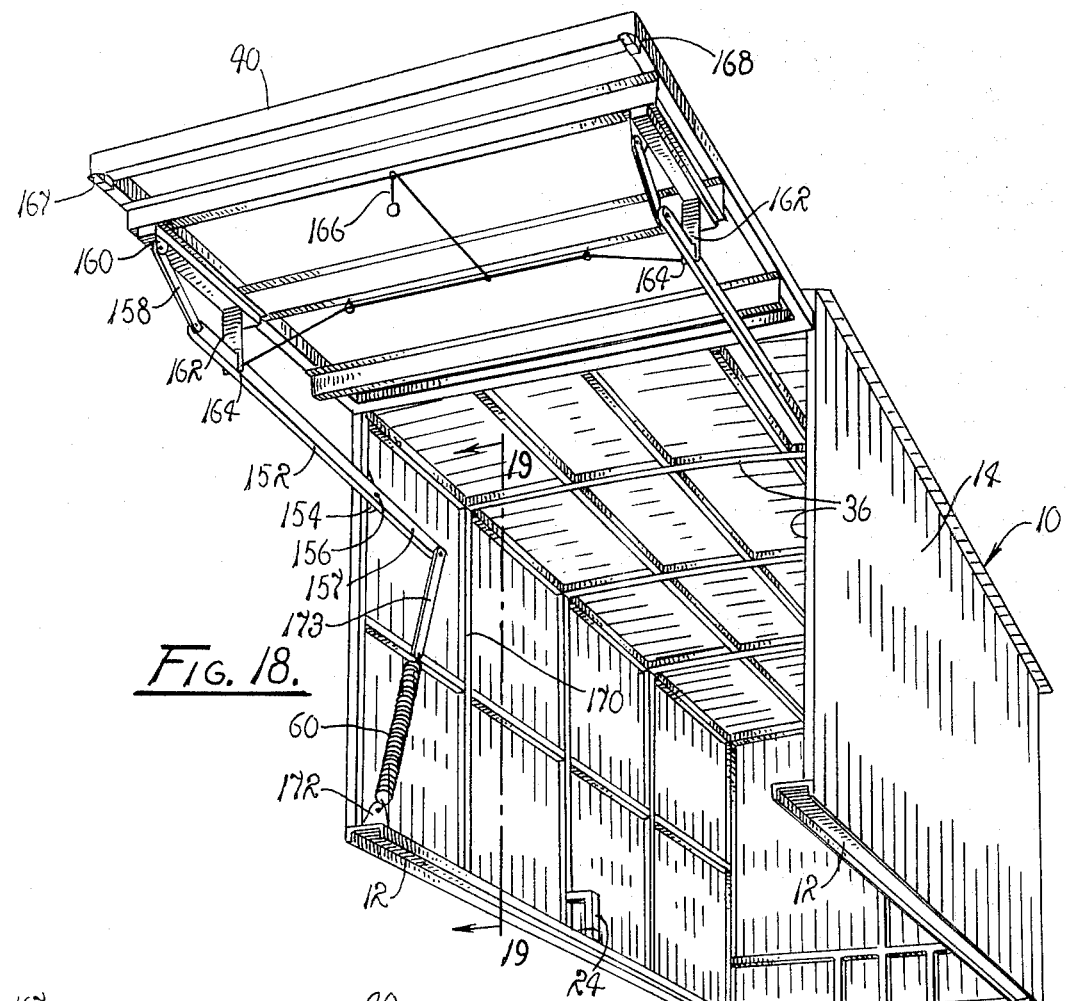
FIG. 18 is a bottom perspective view of a second embodiment of my invention.

Referring now to the drawings, FIGS. 1-6 show a first embodiment of my invention. My mobile aircraft hangar 10 has a chassis 12, a body compartment 14, a pair of wing compartments 16 and closure panels 18.

The chassis 12 is generally U-shaped in its plan configuration and has a towing tongue 20 attached to the connecting portion of the U. The tongue 20 is suited for attachment of the mobile hanger 10 to a towing vehicle.

Attached to the parallellegs of the chassis 12 intermediate their length, is a pair of oppositely disposed retractible wheels 22. The wheels 22 are mounted, one to each leg of the chassis 12, by means of mounting frames 24 and wheel support arms 26.

As best shown in FIG. 6, the wheel support arms 26 are each mountable to one of the mounting frames 24 on each side of the chassis in one of two receptacles, a lower receptacle 28 and upper receptacle 30. The wheels 22 are each rotatably mounted to the outer end of their associated wheel support arm by means of a bearing. Holes 31 are provided in the inner ends of each of the wheel support arms and in the inner ends of the upper and lower receptacles in the mounting frames 24. The wheel support arms are attached in the receptacles of the mounting frames 24 by pins 32 passed through these holes. The receptacles in the mounting frames 24 are so located with respect to the chassis 12 that the wheels 22 are retracted above the chassis when the wheel support arms are in the upper receptacles 30 and are extended below the chassis for movable support of the hangar 10 when the wheel support arms are in the lower receptacles 28.

A jack 34 is mounted on the tow tongue 20 and is extendable so the front of the chassis 12 can be raised from the ground. As the front portion of the chassis 12 is raised from the ground the rearmost portion of the chassis engages the ground and the intermediate portions of the chassis, where the support wheels are mounted, are elevated. When the front of the chassis 12 has been raised a sufficient distance, the wheels 22 can be lowered by removing the wheel support arms 26 from the upper receptacles 30 of the frames 24 and placing them in the lower recepticals 28 thereby lowering the wheels 22 to their movable support positions. When the wheels 22 are in their movable support positions, the inner end of the wheel support arms 26 can be attached again to the mounting frames 24 by the pins 32 to hold the wheesl in this position. Then, by lowering the jack 34 on the front of the chassis, the weight of the trailer can be transferred from the rearmost portions of the chassis onto the wheels. When the chassis has reached a horizontal position it will be resting only on the wheels and ready for towing by the tongue 20.

To form the body compartment 14, a body compartment frame 36 is mounted on the chassis and extended upwardly therefrom to form the walls and roof. The body compartment frame 36 si then covered by closure panels 18 to complete the compartment. The body compartment 14 is of the proper size and configuration to accept the body portion of an aircraft of the class for which the hangar is made, tail first.

At the forward end of the body compartment 14, a winch 38 is mounted which has an extending cable that can be attached to the rear of an airplane. The airplane may then be drawn into the hangar body compartment tail first by actuation of the winch.

At the rear end of the hangar, the body compartment 14 is closed by a retractible overhead door 40. The body compartment door is hinge mounted to the body compartment frame 36 by hinge 41 and has a pair of telescopic side braces 42 each having a lower end 44 connected to the door and an upper end 46 pivotally mounted to the body compartment frame at 48. The side braces 42 are arranged to counterbalance the weight of the door 40 by cables 56 attached to the upper ends 46 of the side braces 42 and passed around pulleys 58 and then connected by tension springs 60 to the body compartment frame 36.

Adjacent the rearward end of the body compartment 14 and on each side of the compartment adjacent the door 40, the body compartment frame is provided with openings 62 to permit the passage of the aircraft wings through the sidewalls of the body compartment. This is necessary so that when the aircraft is drawn in tail first the wings do not engage the sides of the body compartment.

The wing compartments 16 are pivotally mounted on each side of the body compartment 14 adjacent the wing openings 62 and extend laterally outward therefrom. Each of the wing compartments 16 is formed by a wing compartment frame 64 which is supported on the body compartment frame 14 by pivotal mountings 66 and is enclosed by closure panels 18. The wing compartments are each of sufficient size and configuration to accommodate one wing of an aircraft of a class for which the hangar was designed.

The rearward portion of each of the wing compartments 16 is open to permit entry of the wings as the plane is drawn tail first into the body compartment 14. To permit complete enclosure of the aircraft after it is placed in the hangar, a pair of folding wing compartment doors 68 are provided, one on each wing compartment. The wing compartment doors 68 are pivotally attached to the outermost portion of each wing compartment 16 and have two parts 70 and 72 which fold across the rearward wing compartment opening and a third part 74 which folds across the wing openings 62 in the rearward portion of the body compartment 14. When the wing compartment doors are opened the three parts 70, 72 and 74 fold accordion style about the pivotal mounting on the outer end of each wing compartment and extend rearwardly therefrom so they do not conflict with the entry of the aircraft wings into the wing compartments.

The wing compartment doors 68 interlock with the body compartment door 40 so that when these doors are all closed, the hangar 10 provides a complete enclosure for the aircraft and prevents unauthorized access.

When no aircraft is in the body compartment 14, the wing compartments 16 can be pivoted into the body compartment by movement about the pivotal mounting 66. The size of the wing compartments 16 and the body compartment 14 are so coordinated that the two wing compartments 16 fit inside the body compartment 14 when they are so pivoted. The front faces 76 of the wing compartments 16 then engage the stops 78 adjacent the upper edge of the wing openings 62 and a lip portion 80 on the chassis 12 adjacent the lower portion of the wing openings to form the closure for the wing openings 62 and the hangar then has outside dimensions of only the body compartment 14. (See FIG. 5). Also, the body compartment door 40 can be closed with the wing compartments stowed in the body compartment as just described, thus converting the hangar into a configuration for easy mobility.

To accommodate some classes of aircraft it is convenient to provide wing compartments 16 with a configuration which gives them a length greater than the distance from the pivot 66 to the rearmost portion of the body compartment 14. In such a case the wing compartments when pivoted into the body compartment for stowing will extend rearwardly beyond the rearmost portion of the body compartment and prevent closure of the body compartment door 40. When this situation is encountered the wing compartments 16 can be detached at their pivots 66 and moved forwardly in the body compartment until their distal ends are inside the body compartment. The wing compartments 16 are then supported in the body compartment by appropriate hooks or brackets.

OPERATION

In operation, my hangar 10 is set upon a surface suitable for the travel of aircraft such as a parking apron, and, although sufficiently heavy to prevent movement by most environmental conditions, it can be secured to the ground by sandbags or ties to assure permanent anchoring. The aircraft is then placed before the hangar with its tail directed into the hangar and the cable from the aircraft winch 38 at the front of body compartment 14 is extended outwardly through the rear of the hangar and attached to the aircraft. The winch 38 is then actuated to draw the aircraft tail first into the hangar. At this point, the body compartment door 40 is up overhead in its stowed position, and the wing compartment doors 68 are folded back to leave both the wing openings 62 in the body compartment and the rear of the wing compartments 16 open to avoid conflict with the wings. As the aircraft is drawn into the body compartment 14 and the wings reach the rearward portion body compartment they pass into the wing openings 62 and continue rearward until they pass into the wing compartments 16. When the aircraft is completely in the hangar, the wing compartment doors 68 are closed by unfolding the two parts 70 and 72 to cover the rearward openings in the wing compartments and the third part 74 to cover the wing openings in the body compartment. Then the body compartment door 40 is retracted downwardly by rolling the door braces 42 rearwardly along the tracks 50 which elongates the springs 60 of the bias cables 56. When the body compartment door 40 reaches its downwardmost position it interlocks with the third parts 74 of the wing compartment doors 68 to completely close the hangar. Suitable lock means are provided for all the doors and the hangar, therefore, is safe against unauthorized access.

To remove the aircraft, the door 40 on the body compartment is first opened and swung up overhead. Then the wing compartment doors 68 are folded accordion fashion about their pivots at the outermost portions of the wing compartments to open the wing openings 62 and the rearward portions of the wing compartments. With the doors thus disposed, the aircraft can be withdrawn from the hangar without any engagement with hangar parts, either by hand pushing or use of an appropriate tow vehicle.

When it is desired to transport the hangar to a different location, the hangar can be readily placed in convenient condition for this purpose by the following procedures. First, the wing compartments 16 are pivotally folded into the body compartment 16 by swinging them inwardly about their pivotal mountings 66. The third part 74 of the wing compartment doors 68, which cover the wing openings 62, folds back upon the second parts 72 in sandwich fashion for this purpose. As the two wing compartments 16 come together inside the body compartment, the front faces 76 of the wing compartments form a closure of the wing openings 62, and the distal ends of the wing compartments fit inside the rearmost portions of the body compartment 14, so that the body compartment door 40 can be closed when the wing compartments are stowed inside the body compartment. Also, the body compartment door interlocks with the outermost ends of the wing compartments when they are thus stowed to hold them in this condition and again form a completely closed structure. As indicated previously, if the configuration of the wing compartments is such that their distal ends extend rearwardly of the body compartment when so pivoted, the wing compartments are detached at their pivots, move forwardly in the body compartment, and supported by hooks or brackets. The overall dimensions of the hangar, in this condition, are no greater than those of the body compartment 14.

To place the hangar in mobile condition, the jack 34 on the tongue 20 at the forward end of the hangar is extended to raise the forward end and tilt the hangar up on the rearward portions of the chassis 12 as previously expalined. At the proper height, the wheels 22 are lowered to their movable support positions in the manner previously explained. Then the chassis 12 is lowered by means of the jack 34 onto the extended wheels 22 until the chassis is generally horizontal. In this condition the hangar is attached to a propelling vehicle by means of the tongue 20 and towed to the desired new position. Since the overall dimensions of the hangar, when the wing compartments are thus stowed in the body compartment, are designed to meet the general highway standards for towed vehicles, the hangar may be transported over public roadways if desired. By proper design, the hangar 10 can be arranged to meet the dimension standards for towed vehicles on the highways and at the same time be usable for a range of aircraft sizes and configurations.

Referring now to FIGS. 7 through 17 of the drawings, I show a modified form of a first embodiment of my invention. For convenience in describing this modified form, I have used identical numbers to refer to identical parts and new numbers to refer to modified parts of the hangar.

The most important difference between the first form and the second form of my first preferred embodiment relates to the wing compartments 16. Whereas in the first form of my first preferred embodiment these compartments were rectangular in plan view and the doors, which form the rear walls, consisted of three hinged panels 70, 72 and 74, in my second form the wing compartments 96 are trapezoidal in plan view and the doors forming the rear wall consist of two hinged panels 98 and 100. Moreover, the inboard ends of the rear portions of the wing compartments 96 join the body portion 14 at its rearmost edges. This eliminates the need for the third door panel 74 which is utilized in the first form of my first embodiment as a closure of the rearmost walls of the body portion between the rear edges of the body portion and the point of junction between the body portion and the wing portion 16 (see FIG. 4).

A second important difference between the wing compartments 96 in the second form of my first embodiment and the wing compartment 16 in the first form, is that the wing compartments 96 are not hinge mounted at the inner ends on the body compartment 14 as in my first form. Instead the wing compartments 96 are releasably attached to part of the frame members 36 of the body compartment 14 and are removed and carried into the body portion by dolly for stowing during transport. In FIG. 9, the position of the wing compartments 96 when stowed for transport in the body compartment 14 are shown by phantom lines. The wing compartments 96 are connected to the body compartment 14 by releasable connecting frame members at the inner ends of the wing compartments to adjacent frame members of the body portion. More particularly, the inner end of each wing compartment 96 has an upper frame member 102, a lower frame member 104, and a connecting vertically disposed forward frame member 106. The upper frame members 102, of each wing compartment, are connected to an adjacent frame member 108 of the body portion 14 by means of elongated bolts 110, as shown in FIG. 11. The lower frame members 104 are connected to the rearward portion of the chassis 12 by means of aligned eye members 112 affixed to these members, and held by bolts 114, as best seen in FIG. 13. The vertically disposed forward members 106 are connected to adjacent frame members 116 of the body portion by means of eye members 118 and bolts 120, as best seen in FIG. 12. Thus by removing a series of bolts, the wing compartments 96 can be readily detached from the body portion 14 and then placed inside the body portion 14 for stowing during transport.

Since the wing compartments 96 have a width slightly less than the width of the body portion 14 (see FIG. 9), a pair of removable longitudinal support rails 122, and a removable transverse support rail 124 are used to support the wing compartments 96 in their stowed positions. These rails are put in place by first bolting the transverse support rail 124 between the rearmost portions of the chassis 12 and then disposing the two longitudinal support rails 122 slightly inboard of the longitudinal members of the chassis 12 with their forward ends mounted on the forward transverse member of the chassis 12 and their rearward ends bolted to the transverse support rail 124.

Also, since the top wing compartments 96 are unsupported at the rearmost edges of their inner ends after they have been detached from the body portion 14, a pair of removable vertical supports 126 are inserted between the rearmost ends of the upper frame member 104 (one in each wing compartment) to support this portion of the wing compartment top during stowing of the wing compartments.

To lock the wing compartment door panels 98 and 100 when the wing compartments are attached to the body portion 14 in their use positions, I provide a door locking mechanism 130 on each of the wing compartments. The door lock mechanism 130 consists of a turn handle 132 with a key lock, on the outside of the door panels (see FIGS. 16 and 17). The turn handle 132 carries a double throw lever 134 on its inside end which is attached to an upper latch 136 and a lower latch 138 by means of an upper connecting lever 140 and a lower connecting lever 142. The latches 136 and 138 have spring loaded bolts which when extended lock behind upper frame member 144 and lower frame member 146 of the wing compartments 96. On the face of the door panels 98 and 100 there are upper and lower lip flanges 148 and 160, respectively. The upper lip flange 148 overlaps the upper frame member 144 and the lower lip flange 150 overlaps the lower frame member 146 to complete the closure formed by the door panels and to prevent the door panels from being pushed inwardly into the wing compartments 96. The latch mechanism 130 prevents the door panels from being drawn outwardly, thereby providing a secure closure for the wing compartments.

In the second form of my first embodiment, the body compartment door 40 is mounted differently than in the first form. In place of the telescopic side braces 42, a pair of support arms 152 are provided. These arms are pivoted adjacent their forward ends on arm mounting plates 154 located in the upper part of the body portion 14. The point of pivotal mounting 156 is spaced rearwardly somewhat from the foremost ends of the support arms 152 to leave a short lever arm 157 on each arm.

At their distal ends, the arms 152 are interconnected with a lower portion of the door 40 by means of arm extension members 158 which attach to the door by means of door plates 160. The extension arm members 158 are pivotally mounted both to the distal end of the support arms 152 and to the door plates 160 and thereby form a linkage connection which is movable to adjust to radius differences between the pivot point 156 of the support arms and the lower portion of the door 40 as the door is swung between its closed position and its open position.

Also, in my second form, the bias spring 60 is connected to the arm members 152 rearwardly rather than forwardly of the pivot point 156 as was the case in the first form. This permits the pulley 58 over which the cable 56 travels to connect the bias spring 60 to the support arms 152 to be be positioned at the very top of the body portion 14, thus providing greater head room in the body portion of my hangar.

To secure the door 40 in its open position, my second form has arm latch members 162 which extend perpendicular to the door and engage and hold the distal ends of the support arms 152 when the door is in its open position. The latch members 162 each have a pivotally releasable catch 164 (see FIG. 15) which is actuated to its release position by a pull cord 166.

To lock the body compartment door 40 in its closed position, I provide base latches 167 and 168, one adjacent each side edge of the door. The latches 167 and 168 have spring loaded bolts which when extended lock behind shoulders on the rearmost end of the chassis 12. The latches 167 and 168 are individually releasable manually from inside the body portion by means of release handles 169.

Figure 19:
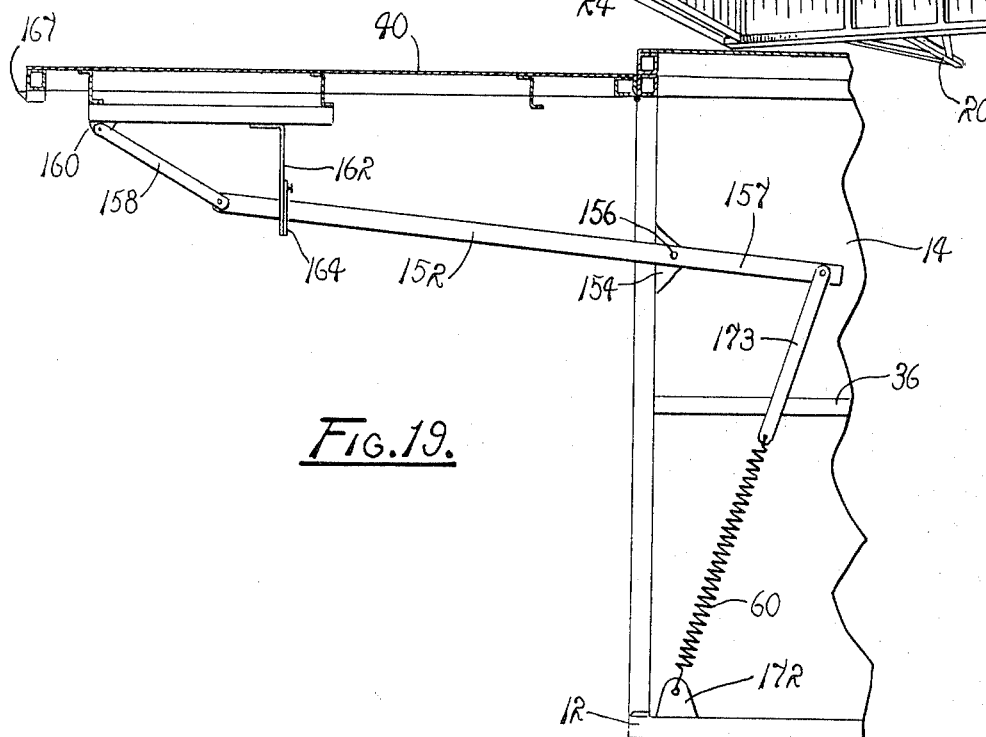
FIG. 19 is a partial side elevational view of a second embodiment of my invention.

In FIGS. 18 and 19 I show a second preferred embodiment of my invention in which the hangar 10 is modified by eliminating the wing compartments 16. In this form it is useful as a mobile general utility building. Again, for purposes of convenient description, the like portions of this embodiment bear the same numbers as assigned to them in my first embodiment, while the different portions are identified by new numbers.

In this second embodiment the hangar 10 has the body portion framework 36 extended rearwardly to the compartment door 40. The open spaces where the wing compartments 16 of my first embodiment were attached to the body portion are filled in by additional frame members 170, as best shown in FIG. 18. The support mechanism for the door 40 is substantially the same as the mechanism described in the second form of my first embodiment except that the bias springs 60 are anchored to plates 172 at the base of the body portion 14 on the rearmost ends of the chassis 12. The bias springs 60 extend upwardly and forwardly therefrom and have their upper ends attached to the forwardly extended lever arms 157 on each of the support arms 152 and the cable 56 and pulley 58 are eliminated.

Also, in my second embodiment the base latches 167 and 168 on the compartment door 40 are releasable by a key-locked handle positioned outside the door. Othcrwise, the second embodiment is substantially the same as my first embodiment.

From the above description it will thus be understood that I have provided a mobile aircraft hangar which is capable of meeting the objects and attaining the advantages heretofore attributed to it. Not only is my hangar able to be towed on highways, but it provides complete enclosure of the aircraft to the same extent as a permanent hangar and prevents unauthorized access or injury to the aircraft from the elements. Furthermore, my aircraft hangar provides the additional benefits of low cost, a minimum of maintenance and ready convertibility from stationary to mobile status.

Finally, my hangar is a highly versatile structure in that it can be converted into a mobile general utility building with a minimum of changes.

I claim:

1. A movable aircraft hangar comprising:
a base disposed to rest on a support surface, and having a configuration sufficient to surround the body portion of one of a predetermined group of aircraft when said aircraft is parked;
body enclosure means operatively associated with said base and disposed to enclose the body portion of said aircraft when said aircraft is parked with its body portion surrounded by said base; and
wing enclosure means operatively associated with said body enclosure means disposed to enclose the wing portions of said aircraft when said aircraft body portion is enclosed by said body enclosure means and to cooperate with said body portion enclosure means to form an integral hangar securing said aircraft against unauthorized access, said wing enclosure means being stowable inside said body enclosure means.

2. A movable aircraft hangar as described in claim 1 in which:
said body enclosure means includes a body compartment mounted on said base and having an access door at a rear end thereof disposed to pass the body of an aircraft entering said body compartment; and said wing enclosure means include wing compartments each movably mounted on said body compartment for movement from an extended position projecting laterally outward from opposite sides of said body compartment, to a stow position aligned with and enclosed by said body compartment, said wing compartments each having an access door therein disposed to pass the wings of an aircraft entering said body compartment when said wing compartments are in their extended position.

3. A movable aircraft hangar as described in claim 1 in which:
said body enclosure means includes an elongated body compartment having a forward end, a rearward end and side portions, said body compartment being mounted on said base and having a body compartment access port in said rearward end disposed to permit passage of the body of said aircraft therethrough and into said body compartment, wing openings in the side portions extending rearwardly through the rearward end of said body compartments and disposed to permit passage of the wings of said aircraft therethrough when the body of said aircraft enters said body compartment, and body compartment closure means disposed to close said body compartment access port; and said wing enclosure means includes pair of elongated wing compartments each having a rearward side, a forward side, an outer and inner end, and each being pivotally mounted to and on opposite sies of said body portion with their inner ends in communication with said wing openings and each being movable from an extended position projecting laterally outward from the side portions of said body portion and with their longitudinal axes aligned and substantially normal to the longitudinal axis of said body portion, to a stowed position within said body portion with the forward sides of each forming a closure for its said adjacent wing opening, the rearward sides of each juxtaposed within said body portion, with their longitudinal axes substantially parallel to the longitudinal axis of said body portion and the outer end of each disposed adjacent said access port, and each of said wing compartments each having a wing compartment access port in the rearward side thereof aligned with said wing openings and disposed to permit passage of one wing of an aircraft entering said body portion into a contained relationship with said wing compartment, and wing compartment closure means disposed to close said wing compartment access port and the rearwardmost portion of its adjacent wing opening.

4. A movable aircraft hangar as described in claim 3 in which:
said body compartment access port of said body enclosure means comprises an opening in said rearward end of said body compartment extending in width over substantially the full width thereof and in height from said support surface to a point near but spaced from the top of said body compartment;

said body compartment closure means comprises a retractible door movably mounted on said body compartment for movement from a closed position disposed in closure relationship with said body compartment access port to an open position stowed overhead in said body compartment between the top of said body compartment access port and the top of said body compartment;
said wing enclosure means include a pair of hinges each disposed to pivotally mount one of said wing compartments to each side of said body compartment by interconnecting said forward side of each wing compartment adjacent said inner end to one side of said body compartment adjacent the forwardmost portion of said wing openings;
said wing compartments of said wing enclosure means have a height slightly less than the height of said wing openings and are disposed to pass through said wing openings into said body compartment;
said wing compartment access ports of said wing enclosure means comprises an opening in said rearward side of each of said wing compartments extending from the outer end of said wing compartment to the inner end of said wing compartment and opening at the inner end of said wing compartment into communication with said adjacent wing opening in said body compartment; and said wing compartment closure means includes a three part folding door, a first of said parts being hinged on said wing compartment adjacent the outer end thereof and when closed extending inwardly substantially half the distance of said wing compartment access port, a second of said parts being hinged to the distal end of said first part and when closed extending inwardly substantially the remaining half of the distance of said wing compartment access port, and a third of said parts being hinged to the distal end of said second part and when closed extending rearwardly therefrom to the rearwardmost edge of said wing openings, and when said door is opened said parts being disposed to project rearwardly from the outer end of said wing compartment in sandwiched relationship.

5. A movable aircraft hangar as described in claim 1, in which:
said base includes a chassis having retractable running gear operatively associated therewith, and disposable to permit mobile transport of said hangar.

6. A movable aircraft hangar as described in claim 1, in which:
said base includes a generally U shaped chassis having the U opening directed rearwardly and the U bottom directed forwardly and being of sufficient size to accommodate said aircraft between the legs of said U with a pair of retractible wheels oppositely mounted on the legs of said U substantially intermediate the ends thereof.

7. A movable aircraft hangar as described in claim 6, in which:
said base further includes a towing tongue attached to the forward portion of said chassis and disposed to interconnect with a towing vehicle, and jack means operatively associated with the forward portion of said chassis.

8. A movable aircraft hangar as described in claim 6, in which:
said base further includes wheel mounting means interconnecting said wheels to said chassis comprising a pair of mounting frames mounted on said chassis and a pair of wheel support arms each mountable to opposite ones of said mounting frames in either an upper or lower position and having one of said wheels rotatably mounted on a first end thereof and locking means interconnected between a second end thereof and said mounting frame and disposed to lock said wheel support arm to said mounting frame in one of said positions.

9. A movable aircraft hangar as described in claim 2, in which:
said base includes a chassis having running gear operatively associated therewith.

10. A movable aircraft hangar as described in claim 2, in which:
Said base includes a generally U shaped chassis having the opening directed rearwardly and the U bottom directed forwardly and being of sufficient size to accommodate said aircraft between the legs of said U with a pair of retractible wheels oppositely mounted on the legs of said U substantially intermediate the ends thereof.

11. A movable aircraft hangar as described in claim 3, in which:
said base includes a chassis having running gear operatively associated therewith.

12. A movable aircraft hangar as described in claim 3, in which:
said base includes a generally U shaped chassis having the U opening directed rearwardly and the U bottom directed forwardly and being of sufficient size to accommodate said aircraft between the legs of said U with a pair of retractible wheels oppositely mounted on the legs of said U substantially intermediate the ends thereof.

13. A mobile structure comprising:
a generally U-shaped chassis, disposed to rest on a support surface and having a configuration sufficient to surround the body portion of one of the predetermined group of aircraft when said aircraft is parked;
a superstructure mounted on said chassis and defining a central enclosure having an access port disposed at the open end of said chassis, said central enclosure having a configuration sufficient to enclose the body portion of said aircraft when said aircraft is parked with its body portion surrounded by said chassis;
an access door interconnected with said central enclosure and movably mounted adjacent said access port for movement from an open position where said door is free from interference with said access port to a closed position where said door closes said access port and coacts with said superstructure to render said enclosure secure against unauthorized entry;
a pair of oppositely disposed lateral enclosures interconnected with said superstructure and said chassis and extended laterally outwardly on each side of said central enclosure adjacent said access port, said lateral enclosures each having a configuration sufficient to surround the wing portion of said aircraft when said aircraft body is closed by said central enclosure and surrounded by said chassis, and said lateral enclosures each having auxiliary access ports, and auxiliary access doors operatively associated with said auxiliary access ports, and said central enclosure access door and disposed to coact with said superstructure to render said central enclosure and said lateral enclosures secure against unauthorized access;
a pair of wheel mountings interconnected with said wheel chassis, said wheel mountings being oppositely disposed with each adjacent one leg of said chassis; and
a pair of wheels mountable on said wheel mountings and disposed to support said structure for mobile transport thereof.

14. A mobile structure as defined in claim 13, in which:
each of said auxiliary access doors of said lateral enclosures include a pair of panels hingedly joined at their proximal edges with the distal edge of one of said panels hingedly mounted on the outermost side of its auxiliary access port and the distal edge of the other of said panels disposed to interlock with said central enclosure access door when said auxiliary access doors and said central enclosure access door are enclosed, and locking means on each of said auxiliary access door adjacent the hinged junction between the proximal edges of the two panels constituting said doors, said locking means being operable to engage an adjacent portion of its respective access port and lock said panels against hinged movement at their proximally joined edges.

15. A mobile structure as defined in claim 13, in which:

said lateral enclosures are correlated in size and shape to said central enclosure and are releasably attached to said superstructure and chassis whereby said lateral enclosures may be detached from said superstructure and chassis and stowed in said central enclosure for mobile transit of said mobile structure and storage.

* * * * *